(12) United States Patent
Jindal et al.

(10) Patent No.: US 12,549,351 B2
(45) Date of Patent: Feb. 10, 2026

(54) SYSTEM, APPARATUS, AND METHOD FOR HARDWARE BASED CRYPTOGRAPHY

(71) Applicants: Mohan Kumar Jindal, Bangalore (IN); Shailja Jindal, Bangalore (IN)

(72) Inventors: Mohan Kumar Jindal, Bangalore (IN); Srirama Chandra Murthy Pratapa, Bangalore (IN); Sumit Manoj Kavathekar, Bangalore (IN); Ashish Shridhar Jadhao, Bangalore (IN); Jaspritam Singh, Bangalore (IN); Sanchith Vakkalaganti Mahesh, Bangalore (IN); Mayuri Uday Dawande, Bangalore (IN); Pratiksha Ishwar Jondhale, Bangalore (IN); Shon Pravin Taware, Bangalore (IN); Adithi L, Bangalore (IN); Ravindra Madan Lande, Bangalore (IN); Sesha Sowjanya Battula, Bangalore (IN); Akanksha Kishor Bedekar, Bangalore (IN); Rakshanda Baban Tidke, Bangalore (IN); SaiRangesh Thirunagaram, Bangalore (IN); Kanan Subramanium Nadar, Bangalore (IN); Swapnil Sopanrao More, Bangalore (IN); Nikunj Mukeshbhai Vaghani, Bangalore (IN); Sahana Nazar, Bangalore (IN); Sravani Ranam, Bangalore (IN); Jeevan Kumar Reddy Palagani, Bangalore (IN); Hari Prasad Badham, Bangalore (IN); Dinesha Shivangoudra, Bangalore (IN); Achyuth Goud Yesu, Bangalore (IN); Sai Charan Perumalla, Bangalore (IN); Vamsi Krishna Kanumuri, Bangalore (IN)

(73) Assignees: Mohan Kumar Jindal, Bangalore (IN); Shailja Jindal, Bangalore (IN)

( * ) Notice: Subject to any disclaimer, the term of this patent is extended or adjusted under 35 U.S.C. 154(b) by 125 days.

(21) Appl. No.: 18/652,844

(22) Filed: May 2, 2024

(65) Prior Publication Data
US 2024/0291647 A1    Aug. 29, 2024

Related U.S. Application Data

(63) Continuation-in-part of application No. PCT/IN2024/050108, filed on Feb. 3, 2024.

(51) Int. Cl.
*H04L 9/08*    (2006.01)
*G06F 21/31*   (2013.01)

(52) U.S. Cl.
CPC ............ *H04L 9/0877* (2013.01); *G06F 21/31* (2013.01)

(58) Field of Classification Search
CPC ............................... H04L 9/0877; G06F 21/31
See application file for complete search history.

(56) References Cited

U.S. PATENT DOCUMENTS 8,270,610 B2 *   9/2012   Ohtsu ................... H04L 9/0827
                                                      380/278
9,191,200 B1 *  11/2015   Adams .................. H04W 12/06
(Continued)

*Primary Examiner* — Viral S Lakhia
(74) *Attorney, Agent, or Firm* — Jose Cherson Weissbrot

(57) ABSTRACT

Disclosed is a data processing apparatus (104) including a key memory (123) to store a list of cryptography keys, a key USB subunit (132) to enable receiving one or more cryptography keys from a user to generate an updated list of cryptography keys, a cryptography unit (122) to encrypt first data to generate second data based on a cryptography key randomly selected from the updated list of cryptography keys, and decrypt the second data to generate the first data, based on the key, and a USB subunit (130) to enable exchange of the first data between a first external device (Continued)

(104) and the cryptography unit (122), and the second data between a second external device (106) and the cryptography unit (122). The data processing apparatus (102) is implemented on at least one of, a Field Programmable Gate Array (FPGA) and Application Specific Integrated Circuits (ASICs).

17 Claims, 2 Drawing Sheets

(56) References Cited

U.S. PATENT DOCUMENTS

| | | | | |
|---|---|---|---|---|
| 10,983,940 | B2* | 4/2021 | Lefebvre | G06F 21/34 |
| 11,251,944 | B2* | 2/2022 | Bunch | H04L 63/062 |
| 11,569,979 | B2* | 1/2023 | Khanna | H04L 9/0625 |
| 11,783,062 | B2* | 10/2023 | Lounsberry | G06F 21/6218 |
| | | | | 726/30 |
| 12,039,057 | B2* | 7/2024 | Kushtagi | G06F 21/602 |
| 12,301,704 | B1* | 5/2025 | Lozi | H04L 9/3226 |
| 2008/0235521 | A1* | 9/2008 | Gosselin | G06F 21/6218 |
| | | | | 713/193 |
| 2022/0171359 | A1* | 6/2022 | Nagata | G05B 19/0428 |
| 2023/0101345 | A1* | 3/2023 | Shlomovits | H04L 9/085 |
| | | | | 713/189 |
| 2024/0037217 | A1* | 2/2024 | Kaul | H04L 9/0894 |
| 2024/0154798 | A1* | 5/2024 | Friesen | H04L 9/0877 |

* cited by examiner

SYSTEM, APPARATUS, AND METHOD FOR HARDWARE BASED CRYPTOGRAPHY

TECHNICAL FIELD

The present disclosure relates generally to data security. More particularly, the present disclosure relates to a system, an apparatus, and a method for hardware-based cryptography.

BACKGROUND

Cryptography of critical data has become a part of our daily life with applications such as access authentication via digital signature, timestamping of critical documents, secure private communications, digital money transfer, and the like.

The performance of a cryptography system relies completely on the methodology used for encryption and decryption of the data. Some commonly used state of the art encryption techniques includes block ciphers such as the Advanced Encryption Standards (AES), stream ciphers such as Riveset Cipher 4 (RC4), integer-based cryptography such as Rivest-Shamir-Adleman (RSA), Elliptic-Curve Cryptography, and the like. The state of art encryption decryption systems completely relies on cryptography of data using software defined protocols. Specifically, the encryption of data that is to be physically handed over through a Universal Serial Bus (USB) drive or a flash drive is particularly done through software-based systems and approaches. However, the software defined functionality and protocols for a cryptography system is prone to attacks, and thus there is a possibility of compromising the information contents of the critical data. Thus, there is a need for a system, an apparatus, and a method capable of providing secure encryption and decryption of critical data, which demands a need for improvised technical solution that overcomes the aforementioned problems.

SUMMARY

In an aspect of the present disclosure, a data processing apparatus includes a key memory, a key USB subunit, a USB subunit and a cryptography unit coupled to each other. The key USB subunit, the cryptography unit and USB subunit are implemented on at least one of, a Field Programmable Gate Array (FPGA) and Application Specific Integrated Circuits (ASICs). The key memory is configured to store a list of cryptography keys. The key USB subunit is configured to enable reception of one or more cryptography keys from a user such that the one or more cryptography keys are added to the list of cryptography keys to generate an updated list of cryptography keys. The cryptography unit is configured to encrypt first data provided by way of a first external device to generate a second data based on a cryptography key that is randomly selected from the updated list of cryptography keys. The cryptography unit is further configured to decrypt the second data to generate the first data, based on the cryptography key. The USB subunit is configured to enable exchange of the first data between the first external device and the cryptography unit The USB subunit is further configured to enable exchange of the second data between a second external device and the cryptography unit.

In some aspects, the data processing apparatus further includes a hardware interface configured to enable exchange of the first data between the USB subunit and the cryptography unit. hardware interface configured to enable exchange of the second data between the USB subunit and the cryptography unit. The hardware interface is implemented on at least one of, a Field Programmable Gate Array (FPGA) and Application Specific Integrated Circuits (ASICs).

In some aspects, the data processing apparatus further includes a user interface, and an interface controller. The user interface is configured to receive one or more inputs for authentication of the user. The interface controller is configured to enable the user interface to receive the one or more inputs for authentication of the user.

In some aspects, the data processing apparatus further includes a tamper controller. The tamper controller is configured to detect one or more interferences with the data processing apparatus based on a set of tamper conditions. The tamper controller further is configured to erase critical data associated with the data processing apparatus, when at least one tamper condition of the set of tamper conditions is true.

In some aspects, the set of tamper conditions comprising at least one of, a predefined number of wrong authentication attempts by the user, press of an emergency button by the user to generate an emergency signal, and a physical damage to the data processing apparatus.

In some aspects, the data processing apparatus further includes a boot controller. The boot controller is configured to store a set of predefined context protocols such that the boot controller configured to generate one or more boot signals for initiation of at least one of, the key USB subunit, the cryptography unit, the interface controller, the hardware interface, and the USB subunit.

In some aspects, the boot controller is further configured to stop one or more operations of at least one of, the key USB subunit, the cryptography unit, the interface controller, the hardware interface, and USB subunit, when at least one tamper condition of the set of tamper conditions is true.

In some aspects, the critical data associated with the data processing apparatus includes at least one of, the list of cryptography keys, the updated list of cryptography keys, and a set of predefined context protocols stored in the boot controller.

In some aspects, the cryptography unit is further configured to encrypt each cryptography key of the list of cryptography keys and each cryptography key of the one or more cryptography keys prior to storage in the key memory. Furthermore, the cryptography unit is configured to decrypt, prior to the generation of the second data, the key that is randomly selected from the updated list of cryptography keys.

In some other aspects of the present disclosure, a method includes storing, by way of a key memory, a list of cryptography keys. The method further includes enabling, by way of a key USB subunit, receiving one or more cryptography keys from a user such that the one or more cryptography keys are added to the list of cryptography keys to generate an updated list of cryptography keys. Furthermore, the method includes enabling, by way of a USB subunit, exchange of, first data between a first external device and a cryptography unit and second data between a second external device and the cryptography unit. Furthermore, the method includes encrypting, by way of the cryptography unit, the first data provided by the first external device to generate a second data based on a randomly selected key of the updated list of cryptography keys. Furthermore, the method includes decrypting, by way of the cryptography unit, the second data to generate the first data, based on the cryptography keys. The key USB subunit, the cryptography unit and USB subunit are implemented on at least one of, a Field Programmable Gate Array (FPGA) and Application Specific Integrated Circuits (ASICs).

BRIEF DESCRIPTION OF DRAWINGS

The above and still further features and advantages of aspects of the present disclosure becomes apparent upon consideration of the following detailed description of aspects thereof, especially when taken in conjunction with the accompanying drawings, and wherein.

To facilitate understanding, like reference numerals have been used, where possible, to designate like elements common to the figures.

DETAILED DESCRIPTION

Figure 1:
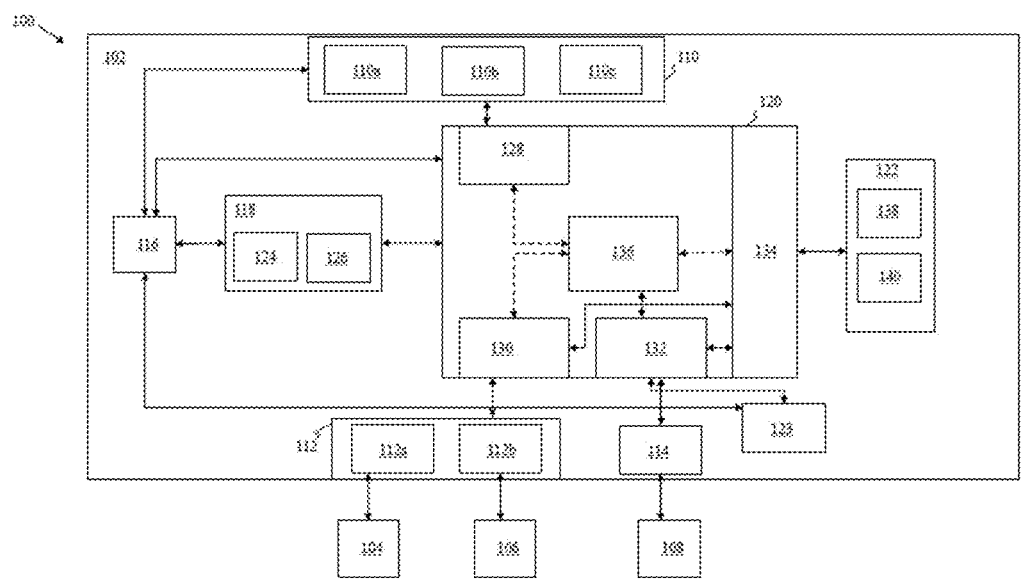
FIG. 1 illustrates a block diagram of a system for hardware-based cryptography, in accordance with an exemplary aspect of the present disclosure.

Various aspect of the present disclosure provides a system, an apparatus, and a method for hardware-based cryptography. The following description provides specific details of certain aspects of the disclosure illustrated in the drawings to provide a thorough understanding of those aspects. It should be recognized, however, that the present disclosure can be reflected in additional aspects and the disclosure may be practiced without some of the details in the following description.

The various aspects including the example aspects are now described more fully with reference to the accompanying drawings, in which the various aspects of the disclosure are shown. The disclosure may, however, be embodied in different forms and should not be construed as limited to the aspects set forth herein. Rather, these aspects are provided so that this disclosure is thorough and complete, and fully conveys the scope of the disclosure to those skilled in the art. In the drawings, the sizes of components may be exaggerated for clarity.

It is understood that when an element is referred to as being "on," "connected to," or "coupled to" another element, it can be directly on, connected to, or coupled to the other element or intervening elements that may be present. As used herein, the term "and/or" includes any and all combinations of one or more of the associated listed items.

The subject matter of example aspects, as disclosed herein, is described with specificity to meet statutory requirements. However, the description itself is not intended to limit the scope of this patent. Rather, the inventor/inventors have contemplated that the claimed subject matter might also be embodied in other ways, to include different features or combinations of features similar to the ones described in this document, in conjunction with other technologies. Generally, the various aspects including the example aspects relate to a system, a data processing apparatus, and the method for hardware-based cryptography.

As mentioned, there is a need for a system, an apparatus, and a method capable of providing secure encryption and decryption of critical data. The present aspects, therefore: provides a system, a data processing apparatus, and a method that provides secure encryption and decryption of critical data to overcome the aforementioned problems.

The aspects herein and the various features and advantageous details thereof are explained more fully with reference to the non-limiting aspects that are illustrated in the accompanying drawings and detailed in the following description. Descriptions of well-known components and processing techniques are omitted so as to not unnecessarily obscure the aspects herein. The examples used herein are intended merely to facilitate an understanding of ways in which the aspects herein may be practiced and to further enable those of skill in the art to practice the aspects herein. Accordingly, the examples should not be construed as limiting the scope of the aspects herein.

FIG. 1 illustrates a block diagram of the system 100 for hardware-based cryptography, in accordance with an exemplary aspect of the present disclosure. The system 100 may include a data processing apparatus 102, a first external device 104, a second external device 106, and a third external device 108 such that the first through third external devices 104-108 may be coupled to the data processing apparatus 102.

The data processing apparatus 102 is implemented using a digital design hardware (such as a Field Programmable Gate Array (FPGA), an Application Specific Integrated Circuits (ASICs), and the like) and does not include any microcontroller for operation. The data processing apparatus 102 may include a user interface 110, one or more data ports 112, a key port 114, a tamper controller 116, a boot controller 118, an interface unit 120, a cryptography unit 122, and a key memory 123.

The user interface 110 may include an input interface 110a for receiving one or more inputs from the user. The input interface 110a may further be configured to enable the user to select and/or provide one or more inputs for registration and/or authentication of the user to use one or more functionalities of the system 100. In some aspects of the present disclosure, the input interface 110a may be configured to enable the user to provide inputs to enable password protection for logging-in to the system 100. In some aspects of the present disclosure, the input interface 110a may be configured to enable the user to provide one or more inputs for a key input authentication of the user. The key input authentication may facilitate the user to input one or more cryptography keys to the data processing apparatus 102 (specifically to be stored in the key memory 123).

Examples of the input interface 110a may include, but are not limited to, a touch interface, a mouse, a keyboard, a motion recognition unit, a gesture recognition unit, a voice recognition unit, or the like. Aspects of the present disclosure are intended to include or otherwise cover any type of the input interface 110a including known, related art, and/or later developed technologies.

The user interface 110 may further include an output interface 110b for displaying (or presenting) one or more outputs (such as notifications generated by the system 100) to the user. Examples of the output interface 110b may include, but are not limited to, a digital display, an analog display, a touch screen display, a graphical user interface, an LED display, an LCD display, an array of LEDs, a light pen, an appearance of a desktop, and/or illuminated characters. Aspects of the present disclosure are intended to include and/or otherwise cover any type of the output interface 110b including known and/or related, or later developed technologies.

Furthermore, the user interface 110 may include an emergency button 110c, such that the emergency button 110c, when pressed by the user, may be configured to generate an emergency signal to facilitate the user to provide an input to the data processing apparatus 102 regarding a tamper condition of the data processing apparatus 102. Examples of the emergency button 110c may include, but are not limited to, push-pull button, twist release button, key release button, touch sensitive button, and the like.

Aspects of the present disclosure are intended to include and/or otherwise cover any type of the emergency button 110c including known and/or related, or later developed technologies.

The one or more data ports 112 may be configured to enable the first and second external devices 104 and 106 to connect with the interface unit 120. Preferably, the one or more data ports 112 may have two data ports (i.e., a first data port 112a and a second data port 112b). The first data port 112a may be configured to connect the first external device 104 to the interface unit 120 such that the data processing apparatus 102 may receive a first data (i.e., plain text data) for processing (i.e., encryption) from the first external device 104, or provide the first data after processing (i.e., decryption) to the first external device 104. The second data port 112b may be configured to connect the second external device 106 to the interface unit 120 such that the data processing apparatus 102 may receive the second data (i.e., cipher text data) for processing (i.e., decryption) from the second external device 106, or provide the second data after processing (i.e., encryption) to the second external device 106.

The tamper controller 116 may be implemented on at least one of, a Field Programmable Gate Array (FPGA) and Application Specific Integrated Circuits (ASICs). The tamper controller 116 may be coupled to the boot controller 118, the interface unit 120, and the key memory 123, and may be configured to detect one or more interferences with the data processing apparatus 102 based on a set of tamper conditions. The tamper controller 116 may further be configured to erase critical data of the data processing apparatus 102, when at least one tamper condition of the set of tamper conditions is true.

In some aspects of the present disclosure, the set of tamper conditions may include at least one of, a predefined number of wrong authentication attempts by the user, press of an emergency button 110c by the user to generate the emergency signal, and a physical damage to the data processing apparatus 102.

In some aspects of the present disclosure, the tamper controller 116 may include a sensing unit (not shown) such that the sensing unit may include a plurality of sensors that may be configured to determine the physical damage to the data processing apparatus 102. In some aspects of the present disclosure, the sensing unit may be configured to determine opening of a lid of the data processing apparatus 102. Examples of the plurality of sensors for determination of the physical damage to the data processing apparatus 102 may include, but are not limited to, a proximity sensor, a pressure sensor, an inertial sensor, an impact sensor, a shock sensor, a load cell sensor, and the like. Aspects of the present disclosure are intended to include and/or otherwise cover any type of the sensors, without deviating from the scope of the present disclosure.

The boot controller 118 may include a context unit 124 and a boot initiation unit 126. The context unit 124 may be configured to store a set of pre-defined context protocols (i.e., set of hardware-based protocols to enable boot-up of various components of the data processing apparatus 102).

The boot initiation unit 126 may be configured to generate one or more boot signals for initiation of various components of the data processing apparatus 102 (such as the user interface 110, the data ports 112, the key port 114, the tamper controller 116, the interface unit 120, the cryptography unit 122, and the key memory 123) based on the set of predefined context protocols stored in the context unit 124. Specifically, the boot signal may initiate one or more operations of at least one of, the key USB subunit 132, the cryptography unit 122, the interface controller 128, the hardware interface 134, and the USB subunit 130.

The boot initiation unit 126 may further be configured to stop one or more operations of at least one of, the various components of the data processing apparatus 102 (such as the user interface 110, the data ports 112, the key port 114, the tamper controller 116, the interface unit 120, the cryptography unit 122, and the key memory 123) when at least one tamper condition of the set of tamper conditions is true. Specifically, the boot initiation unit 126 may be configured to receive information of a tamper condition of the set of tamper conditions from the tamper controller 116, and generate an alert signal corresponding to the tamper condition to be transmitted to the various entities of the data processing apparatus 102. Preferably, the alert signal may disable (or stop) one or more operations of at least one of, the key USB subunit 132, the cryptography unit 122, the interface controller 128, the hardware interface 134, and USB subunit 130.

The interface unit 120 may include an interface controller 128, a Universal Serial Bus (USB) subunit 130, a key USB subunit 132, a hardware interface 134, and a sequence controller 136. In some aspects of the present disclosure, the interface controller 128 may be configured to receive the one or more inputs from the user for the authentication of the user to enable the data processing apparatus 102 to perform at least one of, the encryption of the first data, and the decryption of the second data. The interface controller 128 may further be configured to authenticate the user based on the one or more inputs received by the user by way of the user interface 110. Furthermore, the interface controller 128 may be configured to verify the one or more inputs for key input authentication of the user. In some aspects of the present disclosure, to verify the one or more inputs for the key input authentication, the interface controller 128 may be configured to compare the one or more inputs for key input authentication with a set of predefined key input inputs. When the one or more inputs for key input authentication are matched with the set of predefined key input inputs, the interface controller 128 may enable the key USB subunit 132 to receive the one or more cryptography keys from the third external device 108. Furthermore, the interface controller 128 may be configured to control one or more operations of the user interface 110 to enable reception of one or more inputs from the user and/or provide (displaying or presenting) one or more outputs (or notifications) to the user. In some aspects of the present disclosure, the interface controller 128 may be implemented on at least one of, a Field Programmable Gate Array (FPGA) and Application Specific Integrated Circuits (ASICs).

The USB subunit 130 may be configured to enable an exchange of the first data between the first external device 104 and the cryptography unit 122. Specifically, for encryption, the USB subunit 130 may be configured to enable the first data port 112a to receive the first data from the first external device 104 (for encryption). Specifically, for decryption, the USB subunit 130 may be configured to enable the first data port 112a to provide the first data to the first external device 104. The USB subunit 130 may further be configured to enable an exchange of the second data between the second external device 106 and the cryptography unit 122. Specifically, for encryption, the USB subunit 130 may be configured to enable the second data port 112b to provide the second data to the second external device 106.

Specifically, for decryption, the USB subunit 130 may be configured to enable the second data port 112*b* to receive the second data from the second external device 106. In some aspects of the present disclosure, the USB subunit 130 may be configured to initialize at least one of, the first external device 104 and the second external device 106. The USB subunit 130 may further be configured to generate one or more completion signals that may correspond to either of, a transfer (or exchange) of the first data to/from the first external device 104 and/or a transfer of the second data to/from the second external device 106.

The key port 114 may be configured to enable the third external device 108 to connect with the interface unit 120. The key port 114, upon the key input authentication of the user, may further enable the user to provide the one or more cryptography keys to the interface unit 120 such that the one or more cryptography keys may be added to the key memory 123 to generate an updated list of cryptography keys in the key memory 123.

In some aspects of the present disclosure, when the key input authentication of the user is true, the key USB subunit 132 may be configured to enable reception of one or more cryptography keys from the user to be added to the list of the cryptography keys for generation of the updated list of cryptography keys. The updated list of cryptography keys may be stored in the key memory 123. In some aspects of the present disclosure, the key USB subunit 132 may further be configured to select a cryptography key randomly from the updated list of cryptography keys stored in the key memory 123 for encryption of the first data and/or decryption of the second data.

The hardware interface 134 may be implemented on at least one of, a Field Programmable Gate Array (FPGA) and Application Specific Integrated Circuits (ASICs). The hardware interface 134 may be configured to enable exchange of the first and second data between the USB subunit 130 and the cryptography unit 122. In some aspects of the present disclosure, the hardware interface 134 may be configured to enable exchange of the cryptography key that is randomly selected from the updated list of cryptography keys to the cryptography unit 122. The hardware interface 134 being implemented on at least one of, the Field Programmable Gate Array (FPGA) and Application Specific Integrated Circuits (ASICs) may provide data exchange with a very low (or zero) latency.

The sequence controller 136, upon bootup of the interface unit 120, may be configured to perform one or more specification checks on the various components of the interface unit 120 (i.e., the interface controller 128, the USB subunit 130, the key USB subunit 132, and the hardware interface 134) and the first through third external devices 104-108. The sequence controller 136 may further be configured to enable the various components of the interface unit 120 in a pre-defined sequence for encryption of the first data and/or decryption of the second data.

The cryptography unit 122 may include an encryption engine 138, and a decryption engine 140. The encryption engine 138 may be configured to encrypt the first data to generate the second data based on the cryptography key that is randomly selected from the list of updated cryptography keys stored in the key memory 123. The decryption engine 140 may be configured to decrypt the second data to generate the first data, based on the cryptography key that is randomly selected from the list of updated cryptography keys. Preferably, the cryptography unit 122 may be configured to encrypt the first data and/or decrypt the second data using Advanced Encryption Standards-256 (AES-256). In some aspects of the present disclosure, the cryptography unit 122 may be configured to encrypt each cryptography key of the list of cryptography keys and each cryptography key of the one or more cryptography keys prior to storage in the key memory 123. The cryptography unit 122, prior to the generation of the second data, may further be configured to decrypt, the cryptography key that is randomly selected from the list of cryptography keys.

The first through third external devices 104-108 may be storage devices and may be configured to store first data, second data, and one or more cryptography keys, respectively. Preferably, the first data may be a plain text data. In some aspects of the present disclosure, the first data (i.e., the plain text data) may be generated by decryption of the second data. Preferably, the second data may be a cipher text data. In some aspects of the present disclosure, the second data (i.e., the cipher text data) may be generated by encryption of the first data. Specifically, the one or more cryptography keys may be used for encryption of the first data and/or decryption of the second data. Examples of the first through third external devices 104-108 may include, but are not limited to a Read-Only Memory (ROM), a Random-Access Memory (RAM), a flash memory, a removable storage drive, a hard disk drive (HDD), a solid-state memory, a magnetic storage drive, a Programmable Read Only Memory (PROM), an Erasable PROM (EPROM), and/or an Electrically EPROM (EEPROM). Aspects of the present disclosure are intended to include or otherwise cover any type of the first through third external devices 104-108 including known, related art, and/or later developed storage devices. Preferably, the first through third external devices 104-108 may be Universal Serial Bus (USB) storage devices.

In operation, the data processing apparatus 102 may be configured to enable the user to provide the one or more inputs for authentication and/or key input authentication of the user. Upon key input authentication of the user, the data processing apparatus 102 may be configured to receive the one or more cryptography keys from the user. The data processing apparatus 102 may further be configured to add the one or more cryptography keys to the list of cryptography keys to generate the updated list of cryptography keys, that is stored in the key memory 123. Upon authentication of the user, the data processing apparatus 102 may be configured to receive the first/second data from the first or second external devices 104-106 for encryption or decryption, respectively. The data processing apparatus 102, upon reception of the first or second data, may be configured to select the cryptography key randomly from the updated list of cryptography keys stored in the key memory 123 for encryption of the first data and/or decryption of the second data. The data processing apparatus 102 may further be configured to provide the first or second data to the cryptography unit 122 for encryption or decryption, respectively. Upon encryption of decryption of the first or second data, the data processing apparatus 102 may be configured to generate the second or first data, respectively. Furthermore, the data processing apparatus 102 may be configured to provide the second or first data to the second or first external devices 104-106, respectively. Parallelly, the system 100, by way of the tamper controller configured to detect one or more interferences on the data processing apparatus 102, based on the set of tamper conditions. Upon detection of at least one tamper condition of the set of tamper conditions, the data processing apparatus 102 may be configured to erase the critical data of the data processing apparatus 102.

Figure 2:
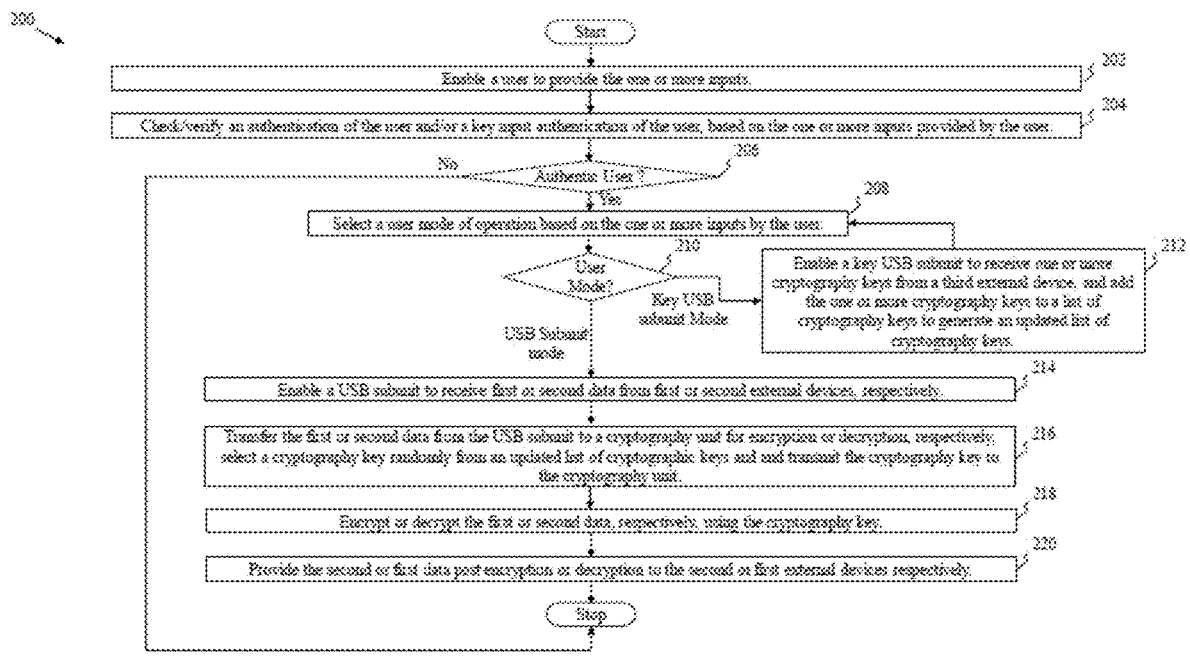
FIG. 2 illustrates a flow chart of a method for hardware-based cryptography, in accordance with an exemplary aspect of the present disclosure.

FIG. 2 illustrates a flow chart of a method 200 for hardware-based cryptography, in accordance with an exemplary aspect of the present disclosure.

At step 202, the data processing apparatus 102 may enable the user to provide the one or more inputs.

At step 204, the data processing apparatus 102 may check or verify the authentication of the user and/or the key input authentication of the user based on the one or more inputs provided by the user.

At step 206, when the authentication of the user and/or the key input authentication is verified, the data processing apparatus 102 proceeds to step 208, else when the authentication of the user and/or the key input authentication is not verified, the data processing apparatus 102 may halt.

At step 208, when the authentication of the user and/or the key input authentication is verified, the data processing apparatus 102 may select a user mode of operation based on the one or more inputs received from the user.

At step 210, when a key USB subunit mode of the user mode of operation is selected, the data processing apparatus 102 proceeds to step 212, else when a USB subunit mode of the user mode of operation is selected, the data processing apparatus proceeds to step 214.

At step 212, when the key USB subunit mode is selected, the data processing apparatus 102 may enable the key USB subunit 132 to receive the one or more cryptography keys from the third external device 108. The data processing apparatus 102 may further add the one or more cryptography keys to the list of cryptography keys to generate the updated list of cryptography keys. Upon generation of the updated list of cryptography keys, the data processing apparatus further proceeds to step 208 for the selection of the user mode of operation.

At step 214, when the USB subunit mode is selected, the data processing apparatus 102 may enable the USB subunit 130 to receive the first or second data from the first or second external devices 104-106, for encryption or decryption, respectively.

At step 216, the data processing apparatus 102 may transfer the first or second data from the USB subunit 130 to the cryptography unit 122 for encryption or decryption, respectively. The data processing apparatus 102 may further select the cryptography key (for encryption or decryption) randomly from the updated list of cryptographic keys, and may transmit the cryptography key to the cryptography unit 122.

At step 218, the data processing apparatus 102 may encrypt or decrypt the first or second data, respectively, using the cryptography key.

At step 220, the data processing apparatus 102 may provide the second or first data post encryption or decryption to the second or first external devices 104-106 respectively.

In some aspects of the present disclosure, prior to each abovementioned step (i.e., from steps 202 to 220), the data processing apparatus 102 may check (or detect) the tamper on the data processing apparatus 102 based on the set of tamper conditions. The data processing apparatus 102 may further erase the critical data associated with the data processing apparatus 102, when at least one condition of the set of tamper conditions is true. In some aspects of the present disclosure, the set of tamper conditions comprising at least one of, the predefined number of wrong authentication attempts by the user, the press of the emergency button 110*c* by the user to generate the emergency signal, and the physical damage to the data processing apparatus 102. In some aspects of the present disclosure, the critical data associated with the data processing apparatus 102 may include at least one of, the list of cryptography keys, the updated list of cryptography keys, and the set of predefined context protocols stored in the boot controller 118.

As mentioned, there is a need for a system, an apparatus, and a method capable of providing secure encryption and decryption of critical data. The present aspects, therefore: provide the system 100, the data processing apparatus 102, and the method 200 to provide secure encryption and decryption of critical data to overcome the aforementioned problems. Specifically, the data processing apparatus for encryption or decryption is implemented only on hardware and does not use any software for encryption or decryption. As the various components of the data processing apparatus 102 are implemented on at least one of, a Field Programmable Gate Array (FPGA) and Application Specific Integrated Circuits (ASICs), the system 100 is nearly impossible to be hacked and thus provides an extensive data security for encryption or decryption. The system 100 further provides an efficient tamper detection and control that avoids compromising critical data associated with the system 100.

The foregoing discussion of the present disclosure has been presented for purposes of illustration and description. It is not intended to limit the present disclosure to the form or forms disclosed herein. In the foregoing Detailed Description, for example, various features of the present disclosure are grouped together in one or more aspects, configurations, or aspects for the purpose of streamlining the disclosure. The features of the aspects, configurations, or aspects may be combined in alternate aspects, configurations, or aspects other than those discussed above. This method of disclosure is not to be interpreted as reflecting an intention the present disclosure requires more features than are expressly recited in each claim. Rather, as the following claims reflect, inventive aspects lie in less than all features of a single foregoing disclosed aspect, configuration, or aspect. Thus, the following claims are hereby incorporated into this Detailed Description, with each claim standing on its own as a separate aspect of the present disclosure.

Moreover, though the description of the present disclosure has included description of one or more aspects, configurations, or aspects and certain variations and modifications, other variations, combinations, and modifications are within the scope of the present disclosure, e.g., as may be within the skill and knowledge of those in the art, after understanding the present disclosure. It is intended to obtain rights which include alternative aspects, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

As one skilled in the art will appreciate, the system 100 includes a number of functional blocks in the form of a number of units and/or engines. The functionality of each unit and/or engine goes beyond merely finding one or more computer algorithms to carry out one or more procedures and/or methods in the form of a predefined sequential manner, rather each engine explores adding up and/or obtaining one or more objectives contributing to an overall functionality of the system 100. Each unit and/or engine may not be limited to an algorithmic and/or coded form, rather may be implemented by way of one or more hardware elements operating together to achieve one or more objectives contributing to the overall functionality of the system 100. Further, as it will be readily apparent to those skilled in the art, all the steps, methods and/or procedures of the system 100 are generic and procedural in nature and are not specific and sequential.

Certain terms are used throughout the following description and claims to refer to particular features or components. As one skilled in the art will appreciate, different persons may refer to the same feature or component by different names. This document does not intend to distinguish between components or features that differ in name but not structure or function. While various aspects of the present disclosure have been illustrated and described, it will be clear that the present disclosure is not limited to these aspects only. Numerous modifications, changes, variations, substitutions, and equivalents will be apparent to those skilled in the art, without departing from the spirit and scope of the present disclosure, as described in the claims.

What is claimed is:

1. A data processing apparatus (102) comprising:
    a key memory (123) configured to store a list of cryptography keys;
    a key USB subunit (132) configured to enable reception of one or more cryptography keys from a user, wherein the one or more cryptography keys are added to the list of cryptography keys to generate an updated list of cryptography keys;
    a cryptography unit (122) configured to (i) encrypt first data provided by way of a first external device (104) to generate second data based on a cryptography key that is randomly selected from the updated list of cryptography keys and (ii) decrypt the second data to generate the first data based on the cryptography key;
    a USB subunit (130) configured to enable exchange of (i) the first data between the first external device (104) and the cryptography unit (122) and (ii) the second data between a second external device (106) and the cryptography unit (122); and
    a hardware interface (134) configured to enable exchange of (i) the first data between the USB subunit (130) and the cryptography unit (122) and (ii) the second data between the USB subunit (130) and the cryptography unit (122);
    wherein the key USB subunit (132), the cryptography unit (122), the USB subunit (130), and the hardware interface (134) are implemented on at least one of, a Field Programmable Gate Array (FPGA) and Application Specific Integrated Circuits (ASICs).

2. The data processing apparatus (102) as claimed in claim 1, further comprising (i) a user interface (110) configured to receive one or more inputs for authentication of the user, and (ii) an interface controller (128) configured to enable the user interface (110) to receive the one or more inputs.

3. The data processing apparatus (102) as claimed in claim 1, further comprising a tamper controller (116) configured to (i) detect one or more interferences with the data processing apparatus (102) based on a set of tamper conditions, and (ii) erase critical data associated with the data processing apparatus (102), when at least one tamper condition of the set of tamper conditions is true.

4. The data processing apparatus (102) as claimed in claim 3, wherein the set of tamper conditions comprising at least one of, (i) a predefined number of wrong authentication attempts by the user, (ii) press of an emergency button (110c) by the user to generate an emergency signal, and (iii) a physical damage to the data processing apparatus (102).

5. The data processing apparatus (102) as claimed in claim 1, further comprising a boot controller (118) configured to store a set of predefined context protocols such that the boot controller (118) is configured to generate one or more boot signals for initiation of at least one of, the key USB subunit (132), the cryptography unit (122), the interface controller (128), the hardware interface (134), and the USB subunit (130).

6. The data processing apparatus (102) as claimed in claim 5, wherein the boot controller (118) is further configured to stop one or more operations of at least one of, the key USB subunit (132), the cryptography unit (122), the interface controller (128), the hardware interface (134), and USB subunit (130) when at least one tamper condition of the set of tamper conditions is true.

7. The data processing apparatus (102) as claimed in claim 3, wherein the critical data associated with the data processing apparatus (102) comprising at least one of, the list of cryptography keys, the updated list of cryptography keys, and a set of predefined context protocols stored in the boot controller (118).

8. The data processing apparatus (102) as claimed in claim 1, wherein the cryptography unit (122) is further configured to (i) encrypt each cryptography key of the list of cryptography keys and each cryptography key of the one or more cryptography keys prior to storage in the key memory (123), and (ii) decrypt, prior to the generation of the second data, the key that is randomly selected from the updated list of cryptography keys.

9. A method (200) comprising:
    storing, by way of a key memory (123), a list of cryptography keys;
    enabling, by way of a key USB subunit (132), receiving one or more cryptography keys from a user, wherein the one or more cryptography keys are added to the list of cryptography keys to generate an updated list of cryptography keys;
    enabling, by way of a USB subunit (130), exchange of (i) first data between a first external device (104) and a cryptography unit (122) and (ii) second data between a second external device (106) and the cryptography unit (122);
    encrypting, by way of the cryptography unit (122), the first data provided by the first external device (104) to generate the second data based on a cryptography key that is randomly selected from the updated list of cryptography keys;
    decrypting, by way of the cryptography unit (122), the second data to generate the first data, based on the cryptography key; and
    enabling, by way of a hardware interface (134), exchange of (i) first data between the USB subunit (130) and the cryptography unit (122), and (ii) the second data between the USB subunit (130) and the cryptography unit (122);
    wherein the key USB subunit (132), the cryptography unit (122), USB subunit (130), and the hardware interface (134) are implemented on at least one of, a Field Programmable Gate Array_(FPGA) and Application Specific Integrated Circuits (ASICs).

10. The method (200) as claimed in claim 9, further comprising receiving, by way of a user interface (110), one or more inputs from the user for authentication of a login of the user.

11. The method (200) as claimed in claim 10, wherein, prior to receiving the one or more inputs from the user, the method (200) comprising enabling, by way of an interface controller (128), receiving the one or more inputs from the user for authentication of a login of the user.

12. The method (200) as claimed in claim 9, further comprising (i) detecting, by way of a tamper controller (116), a tamper on a data processing apparatus (102), based on a set of tamper conditions, and (ii) erasing, by way of the tamper controller (116), critical data associated with the data processing apparatus (102), when at least one condition of the set of tamper conditions is true.

13. The method (200) as claimed in claim 12, wherein the set of tamper conditions comprising at least one of, (i) a predefined number of wrong authentication attempts by the user, (ii) press of an emergency button (110*c*) by the user to generate an emergency signal, and (iii) a physical damage to the data processing apparatus (102).

14. The method (200) as claimed in claim 9, further comprising (i) storing, by way of a boot controller (118), a set of predefined context protocols for generating one or more boot signals for initiation of at least one of, the key USB subunit (132), the cryptography unit (122), the interface controller (128), the hardware interface (134), and USB subunit (130) based on a set of predefined context protocols stored in the boot controller (118).

15. The method (200) as claimed in claim 14, further comprising stopping, by way of the boot controller (118), one or more operations of at least one of, the key USB subunit (132), the cryptography unit (122), the interface controller (128), the hardware interface (134), and USB subunit (130), when the at least one tamper condition of the set of tamper conditions is true.

16. The method (200) as claimed in claim 12, wherein the critical data associated with the data processing apparatus (102) comprising at least one of, the list of cryptography keys, the updated list of cryptography keys, and a set of predefined context protocols stored in the boot controller (118).

17. The method (200) as claimed in claim 9, further comprising (i) encrypting, by way of the cryptography unit (122), each cryptography key of the list of cryptography keys prior to storage in the key memory (123), and (ii) decrypting, by way of the cryptography unit (122), the key that is randomly selected from the updated list of cryptography keys, prior to generating the second data.

* * * * *